Aug. 21, 1934.  M. B. CHAMBERS  1,970,951
ELECTROMAGNETIC BRAKE
Original Filed Oct. 5, 1931
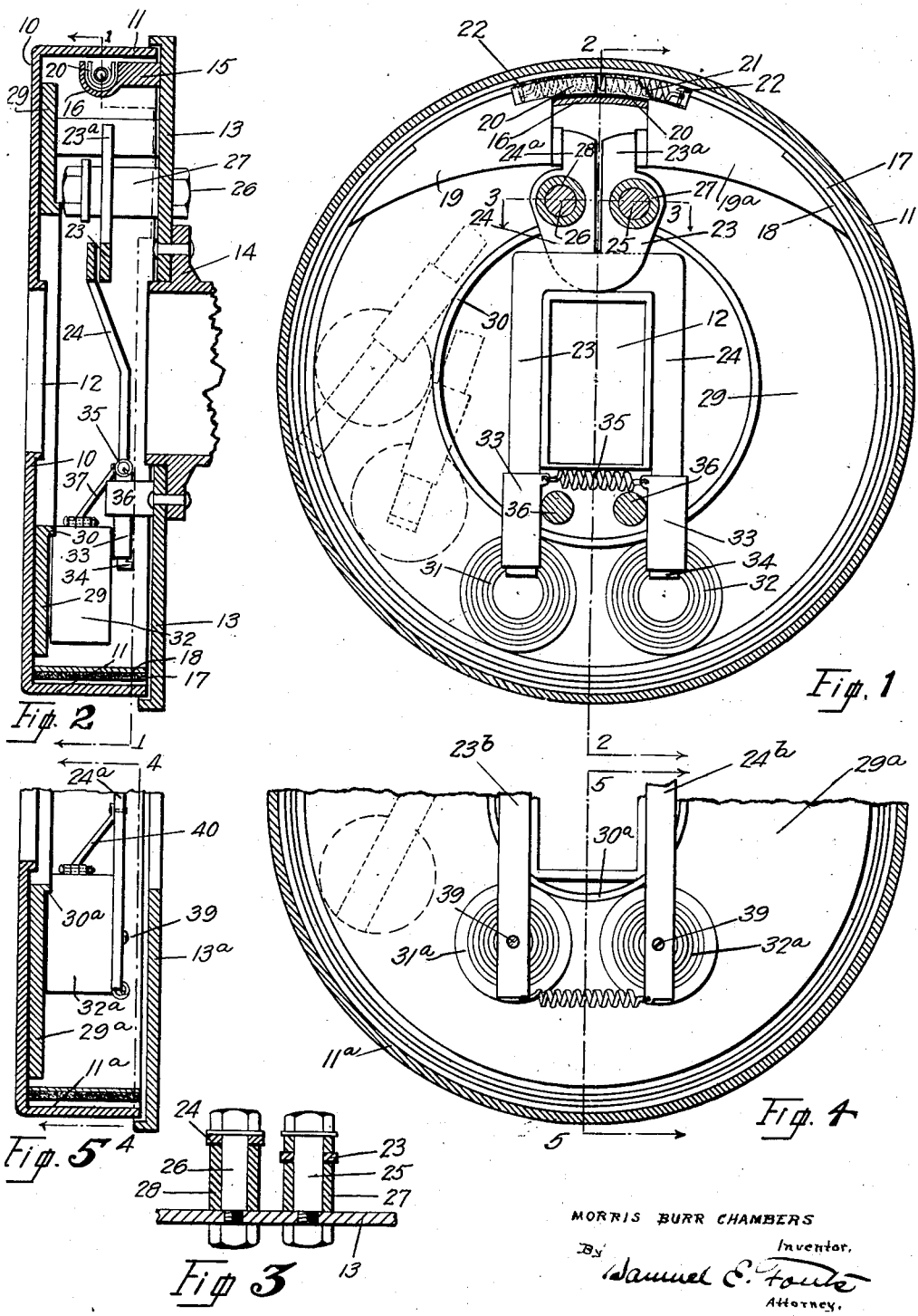
MORRIS BURR CHAMBERS
Inventor.
By Samuel E. Fouts
Attorney.

Patented Aug. 21, 1934

1,970,951

UNITED STATES PATENT OFFICE 1,970,951

ELECTROMAGNETIC BRAKE

Morris Burr Chambers, Huntington Park, Calif., assignor to Chambers Electric Brake Corporation, Seattle, Wash., a corporation of Washington Application October 5, 1931, Serial No. 566,862
Renewed April 14, 1934

10 Claims. (Cl. 188—140)

This invention relates to electro-magnetic brakes, and particularly to brakes for automotive vehicles, its object being the production of a brake which is simple and economical in its construction, powerful in its action, and adapted for application to a vehicle without substantial change in the design of the parts of the latter.

In an application filed by me on June 20, 1931, Serial No. 545,633, I have shown an electro-magnetic brake operating upon the same broad principles as my present invention. This invention is an improvement upon the one shown in my said application, made with the purpose of simplifying and cheapening the construction.

In brakes which are operated by manual power, a considerable force must necessarily be applied to set the brake in the first instance, and that force must be maintained while the brake is in action. Hydraulic or other fluid-pressure brakes require a pump for the fluid and means for operating the pump, all of which add to the initial cost of the vehicle, to its weight, to its upkeep and operating expenses. My brake is operated electro-magnetically by current from any suitable source, as from the battery which furnishes the ignition and lighting currents and which is a part of the necessary equipment of the vehicle. Therefore, my brake adds but little to the initial cost of production of the vehicle and it adds substantially no weight. Further, the operation of the brake requires only a negligible amount of labor in setting or in maintaining it in its set position, all that is required being that expended in closing an electric switch and in maintaining the switch in closed position. Any suitable arrangements of electric circuits may be adopted, and it is believed unnecessary specifically to illustrate the same in the drawing. Any well known rheostat may be included in the circuit to control the current and thus regulate the brake action.

In the drawing forming a part of this application, Fig. 1 is a sectional view taken on the line 1—1 of Fig. 2; Fig. 2 is a vertical sectional view through the center of the brake taken on the line 2—2 of Fig. 1; Fig. 3 is a transverse section on the line 3—3 of Fig. 1; Fig. 4 is a sectional view taken through the lower part of the brake on the line 4—4 of Fig. 5, and showing a modified form of brake operating means, and Fig. 5 is a vertical sectional view on the line 5—5 of Fig. 4.

The drawing shows what I now consider the preferred embodiment of my invention, although it is realized that the details are capable of modification and the claims hereof are not intended to be limited to such details any farther than their specific terms make necessary. Further, the drawing illustrates a brake which is specially adapted to an automotive vehicle, such as a truck or automobile, whereas this form of brake is adapted for more general use. The structure shown may be used in connection with the brake drum of any wheel of the vehicle.

Taking up a detailed description of the invention and referring to the drawing, 10 represents the brake drum which is provided with an outer peripheral flange 11, with the inner side of which the brake band is adapted to contact. The side portion of the drum is provided with a central opening 12 through which the axle, not shown, extends. Opposite the drum 10, and coaxial therewith, is a non-rotatable back plate 13, the same being secured to a stationary member 14, as the rear axle housing, in case the brake is applied to a rear wheel. The said back plate is a flat, circular disk which cooperates with the drum 10 and flange 11 to form a housing within which the other parts of the brake are operatively mounted.

Within the upper part of the housing the back plate is provided with a keeper or hanger 15, which may be an integral part of the plate or a member attached to the latter, as indicated. The inner end of this keeper is provided with a U-shaped channel portion 16, as best shown in section at the top of Fig. 2, said portion forming a guide channel, for a purpose hereinafter specified.

Extending about and just within the flange 11 is the brake band, comprising the brake lining 17 and a steel band 18 to which the lining is attached. The lining extends substantially from one end of the guide channel 16 to the other; but the steel band terminates some distance from the guide channel, its ends being secured to elements 19 and 19a, which are herein termed brake shoes. The body of each of these shoes extends to and abuts against the adjacent end of the guide channel 16, where it is provided with a projecting horn 20, the latter being also U-shaped, as appears in Fig. 2. These horns extend into the channel 16 in which they are guided as the shoes 19 and 19a move during the braking action. The ends of the horns within the channel are slightly spaced when the shoes abut against the ends of the channel, as shown in Fig. 1, to permit of a light relative movement of one without contact with the other. The channel member 16 is, therefore, not only a keeper or guide for these horns but is a stop or anchor for the brake shoes, as will be more fully explained hereinafter. The shoes are drawn normally into contact with the channel member by a helical spring 21 which rests within the U-shaped chambers of the horns, the opposite ends of the spring being suitably secured to the respective shoes by any suitable means, as by a screw or pin 22 indicated in Fig. 1.

The brake band is expanded into frictional contact with the flange 11 of the drum by levers 23 and 24, the same being pivoted upon shoulder-bolts or pins 25 and 26 respectively. Above the pivot bolts, the levers are provided with cams 23a and 24a, the former being adapted to move the shoe 19a to the right when the lever is swung, while the cam 24a is adapted to move the shoe 19 to the left when its lever is swung. As shown in Fig. 1, the lever 23 extends downwardly a slight distance below its pivot bolt 25, then bends to the left across the center of the brake drum and then turns downwardly in a vertical direction substantially parallel with its cam portion 23a but out of alinement therewith. Similarly, the lever 24 extends downwardly for a slight distance below its pivot bolt 26, then bends to the right and finally turns in a downward direction parallel to the corresponding portion of the lever 23. These levers, therefore, extend vertically on opposite sides of the central plane of the brake drum.

The upper parts of the levers 23 and 24 do not lie in the same plane, as is apparent from Figs. 2 and 3, the lever 23 with its cam being nearer the backplate 13 than is the lever 24 with its cam. To secure the proper positioning of these levers upon their pivot bolts, the bolt 25 is provided with a spacing sleeve 27 while the bolt 26 is provided with a similar but longer sleeve 28, the inner ends of the sleeves engaging with the sides of their respective levers. Suitable means on the inner ends of the bolts are provided for holding the levers in contact with the ends of these sleeves. By thus arranging the upper ends of the levers, either may be swung without interference with the other.

Fixedly attached to the inner side of the brake drum 10 and concentric with the axis upon which the drum turns is an annular wear ring 29, the same having a lip or flange 30 projecting inwardly about its inner perimeter, for a purpose hereinafter stated. Beyond this flange the inner face of the wear ring is plain and smooth, being parallel with the inner face of the brake drum.

The levers 23 and 24 are swung to operate the brake by electro-magnetic means. The levers are therefore connected at or adjacent their lower ends to electro-magnets 31 and 32 respectively. These magnets are under control of the operator and are arranged in series in an electric circuit which preferably leads to the battery which furnishes the current for the ignition and lighting means of the vehicle. To regulate the strength of the current, these circuits are preferably provided with rheostats, whereby the proper degree of braking action may be secured. These circuits with their rheostats are so common in the art that specific illustration of the same is thought to be unnecessary. The magnets are so positioned that, when they are de-energized, they will be almost but not quite in contact with the wear plate 29. This plate is of magnetic material and serves as an armature for the magnet. When, therefore, the magnet is energized, it is drawn into contact with the wear plate and adheres thereto. Since this plate is turning with the brake drum, the magnet will move with the drum. Each magnet is mounted upon the lower end of its respective lever 23 and 24 by means of a sleeve 33 through which the lever passes loosely, the sleeve thus being capable of sliding upwardly upon its lever. To hold the sleeves from moving outwardly too far, the levers are each provided with a short projection or foot 34 at their lower ends, as best seen in Fig. 2. The magnets contact with the wear ring just beyond the inner peripheral flange 30 of the ring, which flange prevents the magnets from moving too far toward the center of the brake drum. The levers 23 and 24 are pulled toward each other at their lower ends by a helical spring 35 which is attached at its opposite ends to the respective sleeves 33. The spring holds these sleeves against stationary stops 36 which project inwardly from the back plate 13, as is clear from Fig. 2. The magnets are secured to the lower parts of their respective sleeves 33 by any suitable means. To strengthen the connection, I prefer to extend a brace 37 from the upper surface of the magnet to the upper end of the sleeve 33, the purpose being to attach the magnets rigidly to their sleeves and to have the latter slide freely upon the levers and rock slightly thereon, if need be, to adapt the magnets to the surface of the wear plate. In Fig. 1, the magnet 31 is shown in its lowermost position. When it is energized it will be carried about with the wear plate 29 until it takes a position to the left, as shown in dotted lines in said figure, it being assumed that th drum is turning to the right, or clock-wise. In so moving it travels in an arc about the axis of the drum; and, since the pivot of the lever is at 25, it is evident that the sleeves 33 is compelled to slide upon the lever as the magnet moves.

If the magnets 31 and 32 be in series relation, as is preferred, both will be energized and de-energized together; and whereas the magnet 31 may, when energized, move clockwise, as indicated in Fig. 1, the magnet 32 will be held from such movement by the engagement of the lever 24 with the respective stop 36. Again, if the drum be turning in the anti-clockwise direction and the magnets be energized, the magnet 32 will move with the wear plate 29 but the magnet 31 will be held by its stop 36. It is obvious that the magnets could be placed in parallel relation and controlled separately; but such an arrangement would introduce a factor of danger, since the operator in his excitement at a critical moment might cause the wrong magnet to be energized. I therefore prefer to place the magnets in series, as stated.

When the lever 23 is thus swung, the cam 23a at its upper end forces the shoe 19a to the right and expands the brake lining into contact with the flange 11, it being understood that the shoe 19 is held against movement to the right by reason of its engagement with the left hand end of the channel 16. When the brake drum is turning in the opposite direction, the magnet 32 is energized to swing the lever 24 to the right, thus to move the brake shoe 19 to the left and expand the lining into contact with the brake flange. By placing the pivot bolts 25 and 26 directly below the operating faces of the cams 23a and 24a, the cam faces move substantially normal to the cooperating faces of the shoes and have little if any sliding movement thereon, thus avoiding unnecessary wear.

In Figs. 4 and 5 I have shown a modified form of mounting for the magnet. The lower ends of the levers are indicated at 23b and 24b respectively, the back plate at 13a, the brake flange at 11a and the wear plate at 29a. The wear plate has an inner peripheral flange 30a and, in this form, the plate is wider than in the first form for the reason that the magnets 31a and 32a are secured directly to their respective levers. When, in this construction, the magnet 31a is energized and is swung to the left, as indicated in dotted lines in Fig. 4, the magnet travels outwardly across the face of the wear plate. The magnet may be rigidly attached to the lever, as by a screw or bolt 39, and by a brace 40 which connects the upper surface of the magnet direct with the lever. It will be understood that, in either type of construction, it is necessary for the magnets to move laterally into contact with the wear plate. This movement is so slight that there is sufficient yielding, even in the structure of Fig. 4, to permit this movement. In the structure of Fig. 1, sufficient looseness between the sleeve and lever may be provided to accommodate the movement if further provision to that end is found desirable.

As stated, various changes in the details disclosed may be resorted to without departure from the spirit of the invention. This is particularly true as to the specific means shown for attaching the magnets to their respective levers.

Having thus described my invention, I claim:

1. An electro-magnetic brake comprising a rotatable drum having a brake flange thereon, a split brake band having a lining within said flange, a shoe for and connected with each end of the brake band, a stationary guide for said shoes, means for drawing said shoes toward said guide and for normally holding the brake lining out of braking engagement with said brake flange, a pivoted lever for each brake shoe, an electro-magnet for and mounted upon each of said levers adjacent one end of the latter, said electro-magnets being so positioned that, when energized, they adhere to the brake drum and are moved by it as it rotates, thus to swing their respective levers, and means on said levers for engaging and moving their respective brake shoes to cause the brake band to expand and to bring the lining into braking contact with the drum flange.

2. An electro-magnetic brake as set forth in claim 1 in which the electro-magnets are slidably mounted on their respective levers.

3. An electro-magnetic brake as set forth in claim 1 in which the pivots for the respective levers are spaced apart and the axes of said pivots are substantially in the plane of contact of the means on the levers for engaging the shoes, whereby the movement of said means is substantially normal to said plane, for the purpose specified.

4. An electro-magnetic brake comprising a rotatable brake drum having a flange thereon, a stationary back plate coaxial with said drum and forming therewith a housing, a split brake band having a lining thereon and normally out of contact with the said flange, a brake shoe for and attached to each end of the split brake band, a guide projecting from the back plate between the brake shoes, a horn for and projecting rigidly from each of said brake shoes, said horns cooperating with said guide, means for normally but yieldingly holding the brake shoes in contact with the respective ends of the said guide and the brake band lining out of contact with the brake flange, a pair of levers pivoted to the back plate and having cam ends extending between the brake shoes, an electro-magnet for and mounted upon each of said levers adjacent the ends which are opposite the cam ends, said electro-magnets being so positioned that, when energized, they attract and adhere to the brake drum and are moved by it as it rotates, thus to swing their respective levers and cause their cam ends to move the cooperating brake shoes to bring the brake lining into contact with the brake flange.

5. An electro-magnetic brake as set forth in claim 4 in which the brake drum is provided with a wear plate of magnetic material to which the magnets are attracted when energized.

6. An electro-magnetic brake as set forth in claim 4 in which the guide is a channel member within which the horns on the brake shoes extend, in which the horns are channel-shaped and fit within the channel of the guide and in which the means for normally holding the shoes against the respective ends of the guide is a coiled spring within the channels of the horns, said spring having its ends secured to the respective shoes.

7. An electro-magnetic brake as set forth in claim 4 in which the levers are each provided with a slidable member and the electro-magnets are secured to the respective slidable members.

8. An electro-magnetic brake as set forth in claim 4 in which the pivots for the respective levers are spaced apart and the axes of said pivots are substantially in the planes of contact between the cam ends of the levers and the respective brake shoes.

9. An electro-magnetic brake comprising a rotatable brake drum having a flange thereon, a stationary back plate coaxial with said drum and forming therewith a housing, a brake band having a lining thereon within the said housing and normally out of contact with said flange, a pivot member projecting from said back plate into said housing, a lever pivoted upon said member, a sliding sleeve mounted upon said lever, an electro-magnet carried by said sleeve and adapted, when energized, to be attracted to and to adhere to the rotatable brake drum, whereby the lever is swung upon its pivot, and means operated by the swinging lever for expanding the brake band and forcing the lining thereon into braking relation with the said flange.

10. An electro-magnetic brake comprising a rotatable brake drum having a flange thereon, a stationary back plate coaxial with said drum and forming therewith a housing, a split brake band having a lining thereon normally out of contact with said flange, a brake shoe for and attached to each end of the split brake band means projecting from the back plate for guiding the brake shoes as they are moved in setting and releasing the brake band, means for yieldingly holding the brake shoes in their normal positions with the brake band lining out of contact with the brake drum flange, a pair of levers pivoted to the back plate and having cam ends extending between the brake shoes, an electro-magnet for and mounted upon each of said levers adjacent the ends which are opposite the cam ends, said electro-magnets being so positioned that, when energized, they attract and adhere to the brake drum and are moved by it as it rotates, thus to swing their respective levers and cause their cam ends to move the cooperating brake shoes to bring the brake lining into contact with the brake flange.

MORRIS BURR CHAMBERS.